April 27, 1954 J. T. CARLETON 2,677,084

REVERSIBLE INDUCTIVE LOAD CONTROLLED MAGNETIC AMPLIFIERS

Filed April 9, 1952 2 Sheets-Sheet 1

WITNESSES:
John E. Healey
K. W. Thomas

INVENTOR
James T. Carleton.
BY Ezra W. Savage
ATTORNEY

April 27, 1954 J. T. CARLETON 2,677,084

REVERSIBLE INDUCTIVE LOAD CONTROLLED MAGNETIC AMPLIFIERS

Filed April 9, 1952 2 Sheets-Sheet 2

WITNESSES:

John E. Healy

K. W. Thomas

INVENTOR

James T. Carleton.

BY Ezra W. Savage

ATTORNEY

Patented Apr. 27, 1954

2,677,084

UNITED STATES PATENT OFFICE 2,677,084

REVERSIBLE INDUCTIVE LOAD CONTROLLED MAGNETIC AMPLIFIERS

James T. Carleton, Pittsburgh, Pa., assignor to Westinghouse Electric Corporation, East Pittsburgh, Pa., a corporation of Pennsylvania Application April 9, 1952, Serial No. 281,396

8 Claims. (Cl. 318—141)

This invention relates to regulating and control systems, which incorporate reversible magnetic amplifiers.

A reversible magnetic amplifier is an amplifier, the output current of which reverses its direction of flow when the direction of current flow through its control winding reverses. In the past, such action has been accomplished, for instance, by utilizing a run-around circuit in which the output currents of two magnetic amplifiers are subtracted by means of mixing resistors. The prior art also teaches the use of a voltage bucking circuit and two magnetic amplifiers for accomplishing the same purpose, in which the output voltages of the two magnetic amplifiers produce voltages of opposite polarity across two shunt resistors. However, in such prior art systems, the majority of the power utilized for the system is dissipated in the mixing resistors or shunt resistors, depending upon which system is being utilized.

Heretofore, a reversing action has also been obtained by connecting the outputs of two magnetic amplifiers to a forward and reverse field of, for instance, a generator which has electrically connected to its output a reversible direct-current motor. However, such a reversing system has a serious disadvantage since the inductive coupling between the forward and the reverse fields increases the time constant of the generator.

An object of this invention is to provide for receiving the output signals from two magnetic amplifiers and applying the resultant of these output signals to a rectifier so that the rectified output current passes in both directions through a load.

Another object of this invention is to provide, in a generator regulating and control system, for receiving signals from two magnetic amplifiers and applying the resultant of these output signals to a rectifier so that the rectified output current passes in both directions through the generator field, thereby obtaining a small time constant for the generator.

Figure 1:
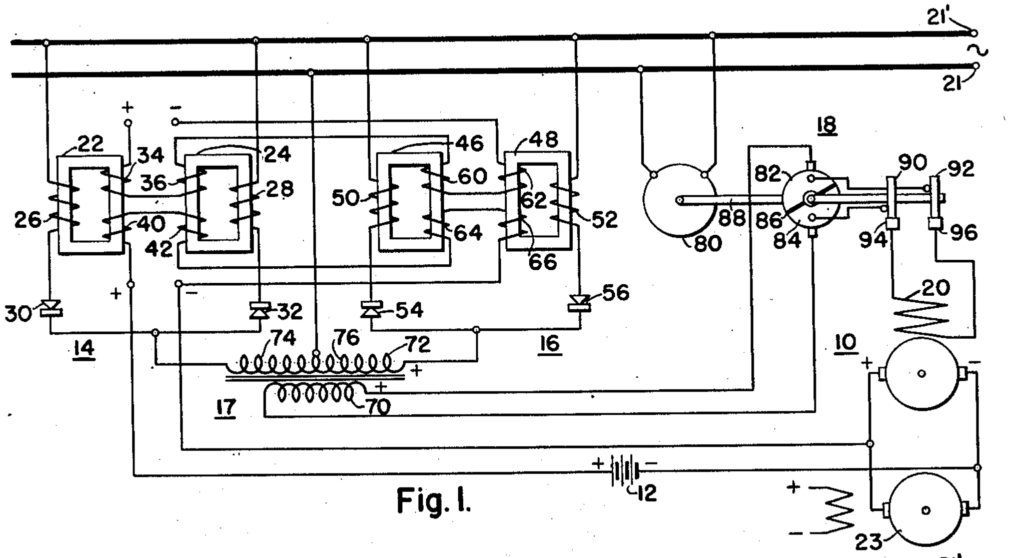
Figure 2:
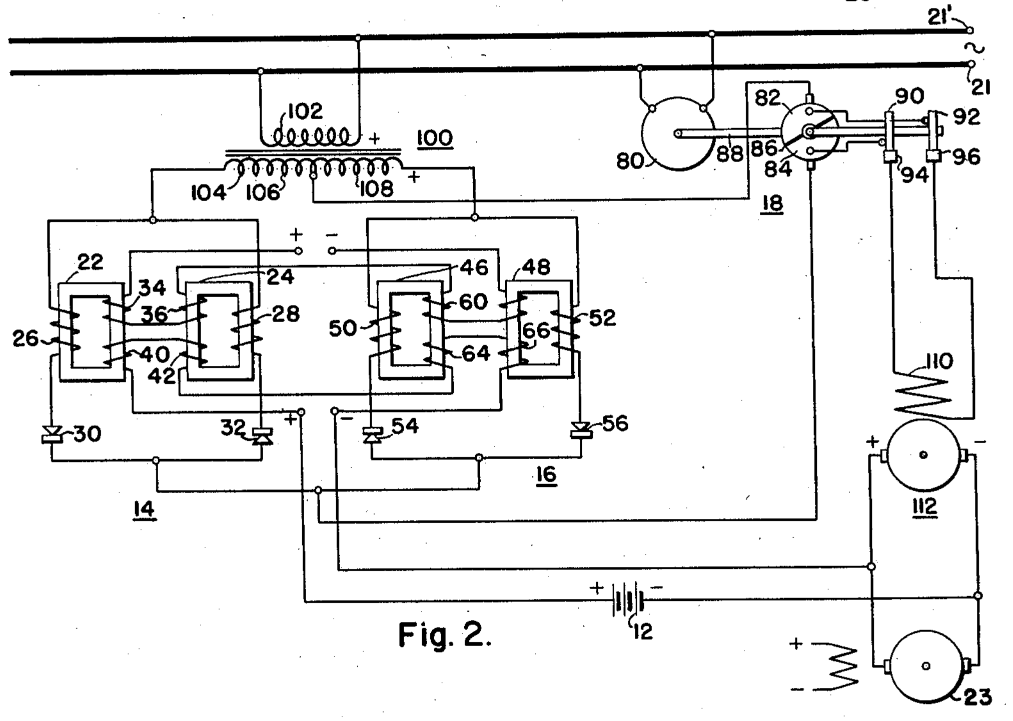
Figure 3:
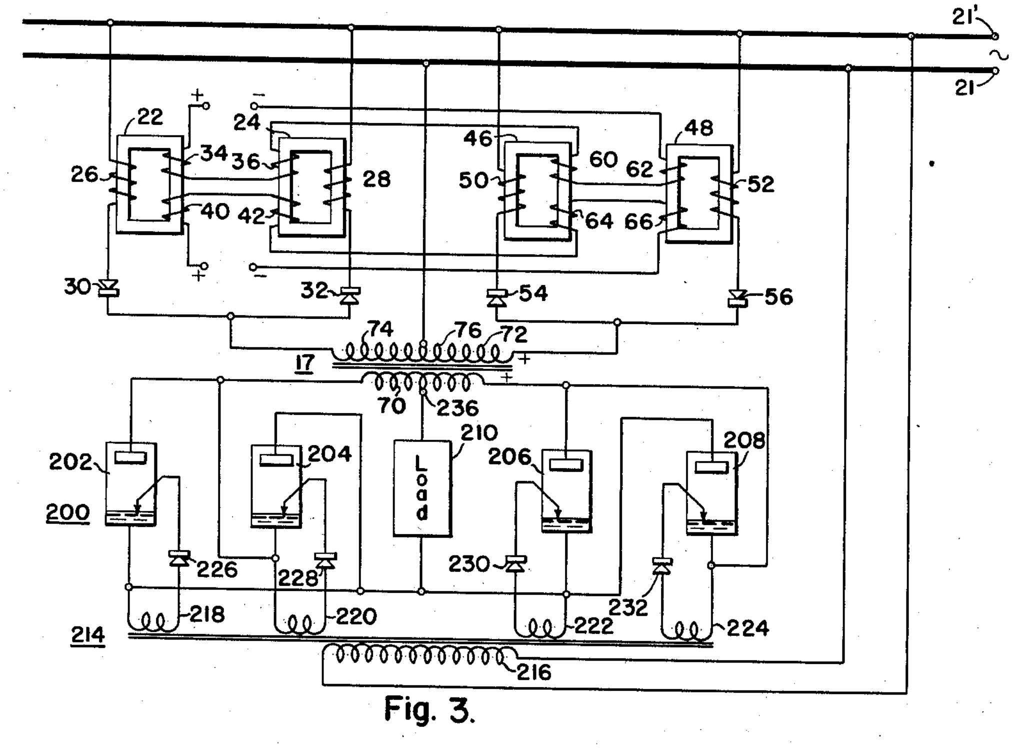
Figure 4:
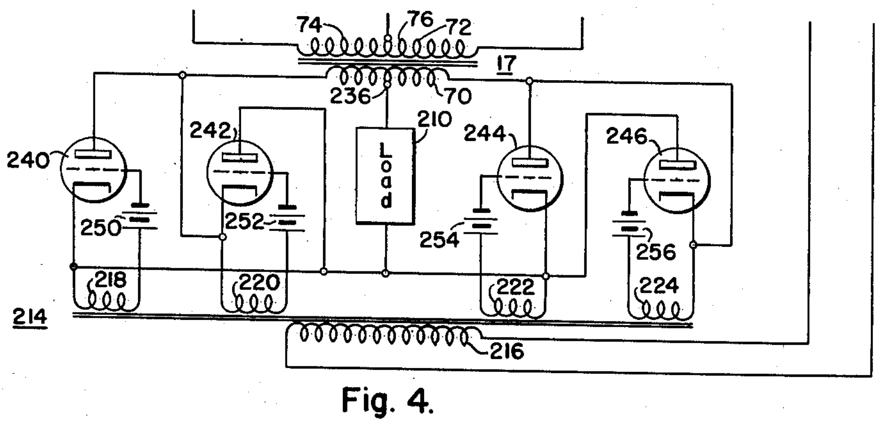

Other objects of this invention will become apparent from the following description when taken in conjunction with the accompanying drawings, in which:

Figure 1 is a schematic diagram illustrating one embodiment of the teachings of this invention, Fig. 2 is a schematic diagram illustrating another embodiment of the teachings of this invention, Fig. 3 is a schematic diagram of still another embodiment of this invention in which a controlled electronic rectifier is substituted for the controlled mechanical rectifier of Fig. 1, and Fig. 4 is a schematic diagram of a further embodiment of this invention in which a different type of controlled electronic rectifier is substituted for the electronic rectifier of Fig. 3.

Referring to Fig. 1 of the drawings, there is illustrated a regulating system for maintaining the output voltage of a generator 10 substantially constant. As illustrated, the regulating system comprises a voltage reference source 12, two magnetic amplifiers 14 and 16 responsive to the output voltage of the generator 10, a potential transformer 17 for obtaining a resultant voltage which is a measure of the difference of the output currents of the two magnetic amplifiers 14 and 16, a controlled mechanical rectifier 18 which is responsive to the resultant voltage and which is disposed to feed current in both directions through the field winding 20 of the generator 10, and terminals 21 and 21′ to which is applied alternating current voltage. In practice, the output voltage of the reference source 12 is of greater absolute magnitude than the output voltage of the generator 10 when it is at its regulated value, the difference voltage effecting a normal excitation of the field winding 20 of the generator 10. However, the magnitude and polarity of the output voltage of the reference source 12 may be varied for purposes hereinafter described. As illustrated, the output of the generator 10 is electrically connected to a direct-current motor 23 having a separately excited field.

In this instance, the magnetic amplifier 14 comprises two suitable magnetic core members 22 and 24. In order to magnetize the core members 22 and 24 a predetermined amount, reactor windings 26 and 28, respectively, are disposed in inductive relationship therewith. On the other hand, to permit the passage of current in only one direction through the reactor windings 26 and 28, self-saturating rectifiers 30 and 32 are ocnnected in series circuit relationship with the reactor windings 26 and 28, respectively, and these two polarized series circuits are connected in parallel circuit relationship in an opposite polarized sense.

For the purpose of magnetizing the core members 22 and 24 a predetermined amount, biasing windings 34 and 36 are disposed in inductive relationship with the core members 22 and 24, respectively. When the polarity of the voltage across the windings 34 and 36 is as shown in the drawing, the current flow therethrough produces flux which opposes the flux produced by the current flow through the reactor windings 26 and 28, respectively. In order to magnetize the core members 22 and 24 in accordance with the output voltage of the generator 10, control windings 40 and 42 are disposed in inductive relationship with the core members 22 and 24, respectively, the current flow through the control windings 40 and 42 for the polarities shown producing a flux which opposes the flux produced by the reactor windings 26 and 28, respectively.

In like manner, the magnetic amplifier 16 comprises two suitable magnetic core members 46 and 48. In order to premagnetize the core members 46 and 48 a predetermined amount, reactor windings 50 and 52, respectively, are disposed in inductive relationship therewith. So as to permit the flow of current in only one direction through the reactor windings 50 and 52, rectifiers 54 and 56 are connected in series circuit relationship with the reactor windings 50 and 52, respectively, the two polarized series circuits in turn being connected in parallel relationship in an opposite polarized sense.

For the purpose of magnetizing the core members 46 and 48 a predetermined amount, biasing windings 60 and 62, respectively, are disposed in inductive relationship therewith. As illustrated, the biasing windings 34 and 36 of the magnetic amplifier 14 and the biasing windings 60 and 62 of the magnetic amplifier 16 are connected in series circuit relationship with one another. In like manner, the current flow through the biasing windings 60 and 62 produces a flux that opposes the flux produced by the current flow through the reactor windings 50 and 52, respectively. Control windings 64 and 66 are also disposed in inductive relationship with the core members 46 and 48, respectively, so that the magnetization of these core members will vary in accordance with the output of the generator 10.

In this instance with the polarities shown, the control windings 64 and 66 are disposed on the core member 46 and 48, respectively, so that the current flow through them produces a flux which is additive to the flux produced by the current flow through the reactor windings 50 and 52, respectively. As illustrated the control windings 40 and 42 of the magnetic amplifier 14 and the control windings 64 and 66 of the magnetic amplifier 16 are connected in series circuit relationship with one another and in series circuit relationship with the reference source 12. In order that this latter series circuit is responsive to the output of the generator 10, it is electrically conneced across the generator output, the reference source 12 being so connected that it opposes the voltage output of the generator 10.

The potential transformer 17, hereinbefore referred to, is provided in order to receive the current outputs of the magnetic amplifiers 14 and 16 and apply across its secondary winding 70, a resultant voltage which is a measure of the difference of the current outputs of the magnetic amplifiers 14 and 16. As illustrated, the potential transformer 17 comprises a primary winding 72 which is divided into two sections 74 and 76. In order to render the section 74 of the primary winding 72 responsive to the current output of the magnetic amplifier 14 and so as to energize the reactor windings 26 and 28 of the magnetic amplifier 14, the parallel circuit comprising the reactor windings 26 and 28, and the section 74 of the primary winding 72 are connected in series circuit relationship across the terminals 21 and 21'. The energizing circuit for the reactor winding 26 and the section 74 when the terminal 21' is positive extends from the terminal 21' through the reactor winding 26, the rectifier 30, and the section 74 to the terminal 21. On the other hand, when the terminal 21 is positive the energizing circuit for the section 74 and the reactor winding 28 extends from the terminal 21 through the section 74, the rectifier 32, and the reactor winding 28, to the terminal 21'.

In like manner, in order to render the section 76 of the primary winding 72 responsive to the output current of the magnetic amplifier 16 and so as to energize the reactor windings 50 and 52 of the magnetic amplifier 16, the parallel circuit comprising the reactor windings 50 and 52, and the section 76 of the primary winding 72 are connected in series circuit relationship across the terminals 21 and 21'. The energizing circuit for the reactor winding 52 and the section 76 when the terminal 21' is positive extends from the terminal 21' through the reactor winding 52, the rectifier 56, and the section 76, to the terminal 21. However, when the terminal 21 is positive, the energizing circuit for the section 76 and the reactor winding 50 extends from the terminal 21 through the section 76, the rectifier 54, and the reactor winding 50, to the terminal 21.

In order to apply a measure of the difference of the output currents of the magnetic amplifiers 14 and 16 to the mechanical rectifier 18, the secondary winding 70 of the transformer 17 is electrically connected to the input of the rectifier 18. In this instance, the mechanical rectifier 18 comprises a synchronous motor 80 whose armature is electrically connected to the terminals 21 and 21', and a rotating element comprising electrically conducting segments 82 and 84, there being an insulating member 86 disposed therebetween. The segments 82 and 84 are suitably secured to a motor shaft 88 which has also suitably secured thereto, two slip rings 90 and 92. It is to be understood that the shaft 88 rotates 180 degrees during each half cycle of the alternating-current voltage across the terminals 21 and 21'. As illustrated, the segment 82 of the rectifier 18 is electrically connected to the slip ring 92 and the segment 84 is electrically connected to the slip ring 90. In addition, brushes 94 and 96 are disposed to make electrical contact with the slip rings 90 and 92, respectively.

In operation, when the output voltage of the generator 10 is at its regulated value, the output current from the magnetic amplifier 16 is of greater magnitude than the output current from the magnetic amplifier 14. Under such conditions, the polarity of the secondary winding 70 of the transformer 17 will cause a current flow to the rectifier 18 and effect a current flow through the field winding 20 of the generator 10.

Assuming that the output voltage of the generator 10 decreases to a value below its regulated value, there is an increase in the current flow through the control windings 40, 42, 64 and 66, to thereby decrease the magnetization of the core members 22 and 24 of the magnetic amplifier 14 and increase the magnetization of the core members 46 and 48 of the magnetic amplifier 16. Since the flux produced by the current flow through the biasing windings 34, 36, 60 and 62 remains substantially constant, the impedance of the reactor windings 26 and 28 will increase to thus decrease the output of the magnetic amplifier 14 and thereby decrease the voltage appearing across the section 74 of the transformer 17. However, with the increase in current flow through the control windings 64 and 66, the flux produced in the core members 46 and 48, respectively, increases and the impedance of the reactor windings 50 and 52 decreases to thereby increase the current output of the magnetic amplifier 16 and the voltage appearing across the section 76 of the transformer 17.

During the half cycle when the terminal 21′ is positive, current flows from one end of the secondary winding 70 of the transformer 17 through the segment 82 of the rectifier 18, the slip ring 92, the brush 96, the field winding 20, the brush 94 of the rectifier 18, the slip ring 90, and the segment 84 of the rectifier 18 to the other end of the secondary winding 70, to thereby increase the curernt flow through the field winding 20 and thus return the output voltage of the generator 10 to its regulated value.

During the next half cycle of the alternating-current energy when the terminal 21 is positive, current flows from the left-hand side of the secondary winding 70 as shown in the drawing, through the segment 82 of the rectifier 18, the slip ring 92, the brush 96, the field winding 20 of the generator 10, the brush 94 of the rectifier 18, the slip ring 90, and the segment 84, to the right-hand side of the secondary winding 70 of the transformer 17.

On the other hand, assuming the output voltage of the generator 10 increases to a value somewhat above its regulated value, the current flow through the control windings 40, 42, 64 and 66 decreases, provided the output voltage of the generator 10 does not exceed the output voltage of the refeernce source 12, thus decreasing the magnitude of the voltage across the field 20 and returning the output voltage of the generator 10 to its regulated value. However, if a reversal in the direction of the motor 23 is desired, the polarity of the reference source 12, as shown in the drawing, is reversed. Such an action reverses the direction of the current flow through the control windings 40, 42, 64 and 66. When this condition exists, the impedance of the reactor windings 26 and 28 of the magnetic amplifier 14 decreases, and the impedance of the reactor windings 50 and 52 of the magnetic amplifier 16 increases to thereby render a greater voltage across the section 74 of the transformer 17 than across the section 76. When the terminal 21′ is positive, current flows from the left-hand side of the secondary winding 70 through the segment 84 of the rectifier 18, the slip ring 90, the brush 94, the field winding 20 of the generator 10, the brush 96 of the rectifier 18, the slip ring 92, and the segment 82 to the right-hand side of the secondary winding 70, to thereby reverse direction of the flow of current through the field winding 20 of the generator 10 and thus reverse the polarity of the output voltage of the generator 10 and thereby reverse the direction of rotation of the motor 23. Assuming the same conditions, when the terminal 21 is positive, current will flow from the right-hand side of the secondary winding 70 of the transformer 17 through the segment 84 of the rectifier 18, the slip ring 90, the brush 94, the field winding 20 of the generator 10, the brush 96 of the rectifier 18, the slip ring 92, and the segment 82, to the left-hand side of the secondary winding 70.

Referring to Fig. 2 of the drawings, there is illustrated another embodiment of the teachings of this invention in which the same reference characters are given to like components of Figs. 1 and 2. The main distinction between the apparatus of Figs. 1 and 2 is that in the apparatus of Fig. 2, a transformer 100 corresponding to the transformer 17 of Fig. 1 is disposed on the input side of the magnetic amplifiers 14 and 16 rather than on the output side of these amplifiers as is the transformer 17 of Fig. 1.

The transformer 100 comprises a primary winding 102 and a secondary winding 104 having two sections 106 and 108 connected in series circuit relationship. In this instance, the primary winding 102 is electrically connected across the terminals 21 and 21′.

In order to energize the reactor windings 26 and 28 of the magnetic amplifier 14, and the reactor windings 50 and 52 of the magnetic amplifier 16, one end of the section 108 of the transformer 100 is electrically connected to the junction point of the reactor windings 50 and 52 and one end of the section 106 is electrically connected to the junction point of the reactor windings 26 and 28. As illustrated, the junction point of the rectifiers 30 and 32 of the magnetic amplifier 14 is electrically connected to the junction point of the rectifiers 54 and 56 of the magnetic amplifier 16.

For the purpose of applying a measure of the difference of the output currents of the magnetic amplifiers 14 and 16 to the rectifier 18 and thus to the field winding 110 of a generator 112, the other ends of the sections 106 and 108 of the transformer 100 are electrically connected to one side of the rectifier 18. The other side of the rectifier 18 is electrically connected to both the junction point of the rectifiers 30 and 32 of the magnetic amplifier 14 and to the junction point of the rectifiers 54 and 56 of the magnetic amplifier 16.

In operation, assuming the output voltage of the generator 112 decreases to a value below its regulated value, there is an increase in the current flow through the control windings 40, 42, 64 and 66 to thereby decrease the magnetization of the core members 22 and 24 of the magnetic amplifier 14 and increase the magnetization of the core members 46 and 48 of the magnetic amplifier 16. When this condition exists, the impedance of the reactor windings 26 and 28 of the magnetic amplifier 14 increases and the impedance of the reactor windings 50 and 52 of the magnetic amplifier 16 decreases.

Assuming the polarities of the windings of the transformer 100 are as is shown in the drawing, two energizing circuits exist for the field winding 110 of the generator 112. One of these energizing circuits extends from one end of the section 108 of the transformer 100 through the reactor winding 52 of the magnetic amplifier 16, the rectifier 56, the segment 84 of the rectifier 18, the slip ring 90, the brush 94, the field winding 110 of the generator 112, the brush 96, the slip ring 92 and the segment 82 of the rectifier 18, to the other end of the section 108. The other energizing circuit for the field winding 110 of the generator 112 extends from the junction point of the sections 106 and 108 through the segment 82 of the rectifier 18, the slip ring 92, the brush 96, the field winding 110 of the generator 112, the brush 94, the slip ring 90, the segment 84 of the rectifier 18, the rectifier 32 of the magnetic amplifier 14, and the reactor winding 28, to the other end of the section 106 of the transformer 100. Since the magnitude of the current flow through the reactor winding 52 of the magnetic amplifier 16 is of greater magnitude than the current flow through the reactor winding 28 of the magnetic amplifier 14, the resultant current flow through these two energizing circuits will flow from top to bottom of the field winding 110 as shown in the drawings to thereby return the output voltage of the generator 112 to its regulated value.

However, on the next half cycle of the alternating-current voltage, two different energizing circuits exist for the field winding 110 of the generator 112. One of these energizing circuits extends from one end of the section 106 of the transformer 100 through the reactor winding 26 of the magnetic amplifier 14, the rectifier 30, the segment 82 of the rectifier 18, the slip ring 92, the brush 96, the field winding 110 of the generator 112, the brush 94, the slip ring 90, and the segment 84 of the rectifier 18, to the junction point of the sections 106 and 108 of the transformer 100. The other energizing circuit extends from the junction point of the sections 106 and 108 through the segment 84 of the rectifier 18, the slip ring 90, the brush 94, the field winding 110 of the generator 112, the brush 96 of the rectifier 18, the slip ring 92, the segment 82, the rectifier 54 of the magnetic amplifier 16, and the reactor winding 50, to the other end of the section 108 of the transformer 100. Since the current flow through the reactor winding 50 of the magnetic amplifier 16 is of greater magnitude under this condition than the current flow through the reactor winding 26 of the magnetic amplifier 14, the resultant current again flows down through the field winding 110 of the generator 112 to thereby return the output voltage of the generator 112 to its regulated value.

Assuming the output voltage of the generator 112 increases somewhat to a value above its regulated value, the current flow through the control windings 40, 42, 64 and 66 decreases to thus decrease the voltage across the field 110 and thereby return the output voltage of the generator 112 to its regulated value. If a reversal of the direction of rotation of the motor 23 is desired, the polarity of the reference source 12, as shown in the drawing, is reversed, to thereby reverse the direction of the flow of current through the control windings 40, 42, 64 and 66. When the direction of the current flow through the control windings 40, 42, 64 and 66 does reverse, the magnetization of the core members 46 and 48 of the magnetic amplifier 16 is decreased and the magnetization of the core members 22 and 24 of the magnetic amplifier 14 is increased. When this condition exists, the impedance of the reactor windings 50 and 52 of the magnetic amplifier 16 increases and the impedance of the reactor windings 26 and 28 of the magnetic amplifier 14 decreases. Since the current flow through the reactor winding 28 is of greater magnitude than the magnitude of the current flow through the reactor winding 52 of the magnetic amplifier 16, the resultant current flow through the field winding 110 as shown in the drawing, is in an upward direction, thus reversing the polarity of the voltage across the field winding 110 and the polarity of the output voltage of the generator 112, to thereby reverse the direction of rotation of the motor 23. If this condition exists, on the next half cycle of the alternating-current voltage, current will continue to flow in the same direction through the field winding 110 of the generator 112.

Referring to Fig. 3 of the drawings, there is illustrated still another embodiment of the teachings of this invention, in which like components of Figs. 1 and 3 have been given the same reference characters. The main distinction between the apparatus of Figs. 1 and 3 is that in Fig. 3 a controlled electronic rectifier 200 is substituted for the controlled mechanical rectifier 18 of Fig. 1 and a regulator system which is not shown. In addition, the electronic rectifier 200 feeds energy to a load, such as the field winding 20 of the generator 10 of Fig. 1, or the field of a reversible motor, or any other load in which it is desirable that the direction of the current flow therethrough can be readily reversed, by reversing the direction of the current flow through the control windings 40, 42, 64 and 66.

The electronic rectifier 200 comprises a plurality of ignitron tubes 202, 204, 206, 208, which are disposed to feed energy to a load 210. The igniting potential for the ignitron tubes 202, 204, 206 and 208 is obtained from a potential transformer 214, having a primary winding 216 which is electrically connected across the terminals 21 and 21' and a plurality of secondary winding sections 218, 220, 222 and 224. As illustrated, the winding sections 218, 220, 222 and 224 are electrically connected to their associated ignitron tube through rectifiers 226, 228, 230 and 232, respectively, to thereby provide an igniting potential for the ignitron tubes at proper intervals.

The winding sections 218, 220, 222 and 224 are so wound that when the right hand side of the secondary winding 70 of the transformer 17 as shown in the drawing is at a positive potential, the desired igniting voltage for the tubes 206 and 208 appears across the sections 222 and 224, respectively, of the transformer 214. However, at this same instant, sufficient igniting voltage for the tubes 202 and 204 does not appear across the sections 218 and 220, respectively, of the transformer 214. On the other hand, on the next half cycle of alternating-current voltage sufficient igniting voltage appears across the sections 218 and 220 of the transformer 214 and sufficient igniting voltages does not appear across the sections 222 and 224.

The ignitron tubes 202, 204, 206 and 208 are so connected to the load 210 and the secondary winding 70 of the transformer 17 that when the right-hand side of the secondary winding 70, as shown in the drawing, is at a positive potential, current flows from this side of the winding through the tube 206 and the load 210 to a center tap 236 on the secondary winding 70. On the next half cycle, current will flow from one terminal of the secondary winding 70 through the tube 202 and the load 210 to the center tap 236 on the secondary winding 70.

Assuming that the current flow through the control windings 40, 42, 64 and 66 reverses its direction so as to reverse the polarity of the potential across the secondary winding 70 of the transformer 17, then current would flow from the center tap 236 of the secondary winding 70 through the load 210 and the tube 208 to the other terminal of the secondary winding 70. On the next half cycle of the alternating-current voltage, assuming the current flow through the control windings 40, 42, 64 and 66 is still in the reverse direction, current will flow from the center tap of the secondary winding 70 of the transformer 17 through the load 210 and the tube 204 to the left-hand side of the secondary winding 70. Thus it can be seen that by reversing the direction of flow of current through the control windings 40, 42, 64 and 66, the direction of the current flow through the load 210 can be reversed.

Referring to Fig. 4 of the drawings, there is illustrated a further embodiment of the teachings of this invention, in which like components of Figs. 3 and 4 have been given the same reference characters. The main distinction between the apparatus of Figs. 3 and 4 is that in the apparatus of Fig. 4, thyratron tubes 240, 242, 244 and 246 are substituted for the ignitron tubes 202, 204, 206 and 208, respectively, of Fig. 3. As illustrated, batteries 250, 252, 254 and 256 are also substituted for the rectifiers 226, 228, 230 and 232, respectively, of Fig. 3 in order to provide a proper grid to cathode biasing voltage for the thyratron tubes 240, 242, 244 and 246, respectively.

Inasmuch as the thyratron tubes 240, 242, 244 and 246 are electrically connected to the transformer 214, the load 210 and the secondary winding 70 of the transformer 17 in the same manner as are the ignitron tubes 202, 204, 206 and 208 of Fig. 1, a description of the circuit connections is considered unnecessary. Likewise, since the operation of the apparatus of Figs. 3 and 4 is substantially identical, such a description is also considered unnecessary.

Although the reversible magnetic amplifier shown in Figs. 1 and 2 has been described with reference to a voltage regulating system, it is to be understood that the output of these reversible magnetic amplifiers could also supply energy to the field winding of a reversible motor or any other load in which it is desirable to reverse the direction of current flow therethrough.

I claim as my invention:

1. In a reversible amplifier, the combination comprising, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, terminals for applying alternating-current voltage thereto, a potential transformer connected in circuit relationship with the parallel connected series circuits and with said terminals, a controlled rectifier connected to said terminals and responsive to the instantaneous polarity of the alternating-current voltage applied to said terminals, the control windings, the potential transformer, and the parallel connected series circuits coacting with one another to deliver a control current to said controlled rectifier that is a function of the difference in the magnitudes of the output currents of the two magnetic amplifiers, the output polarity of said controlled rectifier being determined by the instantaneous polarity relationship between the voltage producing said control current and the alternating-current voltage applied to said terminals.

2. In a reversible amplifier, the combination comprising, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, a potential transformer having a secondary winding and a primary winding comprising two sections, terminals for applying alternating-current voltage thereto, circuit means for connecting one of the magnetic amplifiers and one of the sections of the primary winding to said terminals so that said one of the sections is responsive to the current output of said one of the magnetic amplifiers, another circuit means for connecting the other magnetic amplifier and the other section of the primary winding to said terminals so that said other section is responsive to the current output of said other magnetic amplifier, a controlled rectifier connected to said terminals and responsive to the instantaneous polarity of the alternating-current voltage applied to said terminals, the controlled rectifier also being connected to the secondary winding of the potential transformer, the output polarity of the controlled rectifier being determined by the instantaneous polarity relationship between the alternating-current voltage applied to said terminals and the voltage across the secondary winding of the potential transformer, and a load connected to the output of the controlled rectifier so that current passes in both directions therethrough depending upon the direction of the current flow through the control windings of the two magnetic amplifiers.

3. In a reversible amplifier, the combination comprising, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and responsive to a variable reversible current, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, terminals for applying alternating-current voltage thereto, a potential transformer having a primary winding and a secondary winding comprising two sections connected in series circuit relationship, the primary winding being connected to said terminals and one end of one of the secondary winding sections being connected to one end of one of the parallel connected circuits and one end of the other secondary wniding section being connected to one end of the other parallel connected circuit, a controlled rectifier connected to said terminals and responsive to the instantaneous polarity of the alternating-current voltage applied to said terminals, the controlled rectifier also being connected to the other two ends of the secondary winding sections and to the other two ends of the parallel connected circuits so that the controlled rectifier produces at its output a measure of the difference of the output currents of the two magnetic amplifiers, the output polarity of the controlled rectifier being determined by the instantaneous polarity relationship between the alternating-current voltage applied to said terminals and the voltage between said other two ends of the secondary winding sections and said other two ends of the parallel connected circuits, and a load connected to the output of the controlled rectifier so that current passes in both directions therethrough depending on the direction of the current flow through the control windings of the two magnetic amplifiers.

4. In a regulating and control system for maintaining the output voltage of a generator substantially constant and for reversing the direction of rotation of a motor electrically connected to the output of the generator, the combination comprising, a field winding for the generator, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current determined by the output of the generator, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, terminals for applying alternating-current voltage thereto, a potential transformer connected in circuit relationship with the parallel connected series circuits and with said terminals, a controlled rectifier connected to said terminals and responsive to the instantaneous polarity of the alternating-current voltage applied to said terminals, the control windings, the potential transformer, and the parallel connected series circuits coacting with one another to deliver a control current to said controlled rectifier that is a function of the difference in the magnitudes of the output currents of the two magnetic amplifiers, the output polarity of said controlled rectifier being determined by the instantaneous polarity relationship between the voltage producing said control current and the alternating-current voltage applied to said terminals, and circuit means for connecting the field winding of the generator to the output of the controlled rectifier so that current passes in either direction through the field winding depending on the direction of the current flow through the control windings of the two magnetic amplifiers, to thereby enable a reversal in the direction of rotation of the motor.

5. In a regulating and control system for maintaining the output voltage of a generator substantially constant and for reversing the direction of rotation of a motor electrically connected to the output of the generator, the combination comprising, a field winding for the generator, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current determined by the output of the generator, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, a potential transformer having a secondary winding and a primary winding comprising two sections, terminals for applying alternating-current voltage thereto, circuit means for connecting one of the magnetic amplifiers and one of the sections of the primary winding to said terminals so that said one of the sections is responsive to the current output of said one of the magnetic amplifiers, another circuit means for connecting the other magnetic amplifier and the other section of the primary winding to said terminals so that said other section is responsive to the current output of said other magnetic amplifier, a controlled rectifier connected to said terminals and responsive to the instantaneous polarity of the alternating-current voltage applied to said terminals, the controlled rectifier also being connected to the secondary winding of the potential transformer, the output polarity of the controlled rectifier being determined by the instantaneous polarity relationship between the alternating-current voltage applied to said terminals and the voltage across the secondary winding of the potential transformer, and further circuit means for connecting the output of the controlled rectifier to the field winding of the generator so that current passes in either direction therethrough depending on the direction of the current flow through the control windings of the two magnetic amplifiers, to thereby enable a reversal in the direction of rotation of the motor.

6. In a regulating and control system for maintaining the output voltage of a generator substantially constant and for reversing the direction of rotation of a motor electrically connected to the output of the generator, the combination comprising, a field winding for the generator, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current determined by the output of the generator, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, terminals for applying alternating-current voltage thereto, a potential transformer having a primary winding and a secondary winding comprising two sections connected in series circuit relationship, the primary winding being connected to said terminals and one end of one of the secondary winding sections being connected to one end of one of the parallel connected circuits and one end of the other secondary winding section being connected to one end of the other parallel connected circuit, a control rectifier connected to said terminals and responsive to the instantaneous polarity of the alternating-current voltage applied to said terminals, the controlled rectifier also being connected to the other two ends of the secondary winding sections and to the other two ends of the parallel connected circuits so that the controlled rectifier produces at its output a measure of the difference of the output currents of the two magnetic amplifiers, the output polarity of the controlled rectifier being determined by the instantaneous polarity relationship between the alternating-current voltage applied to said terminals and the voltage between said other two ends of the secondary winding sections and said other two ends of the parallel connected circuits, and further circuit means for connecting the field winding of the generator to the output of the controlled rectifier so that current may pass in either direction through the field winding of the generator depending on the direction of the current flow through the control windings of the two magnetic amplifiers, to thereby enable a reversal in the direction of rotation of the motor.

7. In a reversible amplifier, the combination comprising, two magnetic amplifiers, each magnetic amplifier comprising, magnetic core means, two polarized series circuits each including a rectifier and a reactor winding disposed in inductive relationship with the magnetic core means, the two series circuits being connected in parallel circuit relationship in an opposite polarized sense, and a control winding disposed in inductive relationship with the magnetic core means and disposed to receive a variable reversible current, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, a potential transformer having a secondary winding and a primary winding comprising two sections, terminals for applying alternating-current voltage thereto, circuit means for connecting one of the magnetic amplifiers and one of the sections of the primary winding to said terminals so that said one of the sections is responsive to the current output of said one of the magnetic amplifiers, another circuit means for connecting the other magnetic amplifier and the other section of the primary winding to said terminals so that said other section is responsive to the current output of said other magnetic amplifier, a controlled mechanical rectifier comprising a synchronous motor connected to said terminals so as to be responsive to the instantaneous polarity of the alternating-current voltage applied to said terminals, a rotating element including two electrically conducting segments insulated from one another, the rotating element being driven by the synchronous motor, further circuit means for rendering the rotating element responsive to the output of the secondary winding of the potential transformer, and a load connected to the two segments of the rotating element so that current passes in both directions therethrough depending on the direction of the current flow through the control windings of the two magnetic amplifiers, the output polarity of the controlled mechanical rectifier being determined by the instantaneous polarity relationship between the alternating-current voltage applied to said terminals and the voltage across the secondary winding of the potential transformer.

8. In a reversible amplifier, the combination comprising, two magnetic amplifiers, each magnetic amplifier comprising, magnetic core means, two polarized series circutis each including a rectifier and a reactor winding disposed in inductive relationship with the magnetic core means, the two series circuits being connected in parallel circuit relationship in an opposite polarized sense, and a control winding disposed in inductive relationship with the magnetic core means and responsive to a variable reversible current, the control windings of the two magnetic amplifiers being so disposed on their respective magnetic core means that when the control winding of one of the two magnetic amplifiers effects an increase in the magnetization of its associated magnetic core means the control winding of the other of the two magnetic amplifiers effects a decrease in the magnetization of its associated magnetic core means, terminals for applying alternating-current voltage thereto, a potential transformer having a primary winding and a secondary winding comprising two sections connected in series circuit relationship, the primary winding being connected to said terminals and one end of one of the secondary winding sections being connected to one end of one of the parallel connected circuits and one end of the other secondary winding section being connected to one end of the other parallel connected circuit, a controlled mechanical rectifier including a synchronous motor connected to said terminals and responsive to the instantaneous polarity of the alternating-current voltage applied to said terminals, a rotating element comprising two electrically conducting segments insulated from one another, the rotating element being driven by the synchronous motor, further circuit means for interconnecting the rotating element with the other two ends of the secondary winding sections and with the other two ends of the parallel connected circuits, and a load connected to the two segments of the rotating element so that current passes in both directions therethrough depending on the direction of the current flow through the control windings of the two magnetic amplifiers, the output polarity of the control mechanical rectifier being determined by the instantaneous polarity relationship between the alternating-current voltage applied to said terminals and the voltage between said other two ends of the secondary winding sections and said other two ends of the parallel connected circuits.

References Cited in the file of this patent

UNITED STATES PATENTS

| Number | Name | Date |
|---|---|---|
| 2,453,470 | Stienitz | Nov. 9, 1948 |
| 2,504,878 | Reilly | Apr. 18, 1950 |

OTHER REFERENCES

AIEE Misc. Paper 50–93, Dec. 2, 1949, "Magnetic Amplifiers of the Balance Detector Type, Their Basic Principles, Characteristics, and Applications," by W. A. Geyer, American Institute of Electrical Engineers, New York, N. Y.